United States Patent
Atwell et al.

[15] 3,654,967
[45] Apr. 11, 1972

[54] TEXTILE-REINFORCED ALL-POLYMERIC HOSE AND METHOD OF MAKING SAME

[72] Inventors: William J. Atwell, Bloomingdale; Lawrence Cranston, Ramsey, both of N.J.

[73] Assignee: Uniroyal, Inc., New York, N.Y.

[22] Filed: July 17, 1970

[21] Appl. No.: 55,784

Related U.S. Application Data

[63] Continuation-in-part of Ser. No. 818,236, Apr. 22, 1972, abandoned.

[52] U.S. Cl.............................................138/144, 156/188
[51] Int. Cl..............................................................F16l 9/14
[58] Field of Search.........................................138/121–153; 57/140 R, 153; 156/188

[56] References Cited

UNITED STATES PATENTS

| 3,117,597 | 1/1964 | Fritz et al............................138/130 |
| 2,934,126 | 4/1960 | Wilson...................................57/153 |
| 3,525,206 | 8/1970 | Hersh et al............................57/153 |

*Primary Examiner*—Houston S. Bell, Jr.
*Attorney*—Robert J. Patterson

[57] ABSTRACT

An all-polymeric textile-reinforced hose particularly suited for pressure service, typically an all-nylon hose, and a method of making same are disclosed. The hose comprises an inner thermoplastic tube, two or more successive layers of thermoplastic textile reinforcement wound helically (spirally), each successive helically disposed reinforcing layer being disposed oppositely to the preceding layer, and a polymeric outer protective jacket. The innermost reinforcing layer is fused to the inner tube and successive reinforcing layers are fused to one another. This fusion is typically accomplished by softening with a resorcinol-water solution followed by juxtaposition of the components to be joined after which the resorcinol softening agent is removed with a water bath. Before the outer polymeric jacket is applied, the assembly is softened with a softening agent which is thereafter removed; this effects activation of the plastic in the outer helical textile layer and such activation, coupled with the activation in the rest of the structure as a result of previous treatments with a softening agent and removal thereof, enhances bonding of the outer jacket to the assembly.

The textile reinforcement may be constituted by synthetic multifilament yarns made of continuous thermoplastic filaments, having a total twist (including any so-called producer's or manufacturer's twist) of from 0 to 15 turns per inch, preferably from 1 to 5 turns per inch. Alternatively, but generally less preferably, the reinforcement may be formed of thermoplastic staple yarns or of so-called monofils.

7 Claims, 5 Drawing Figures

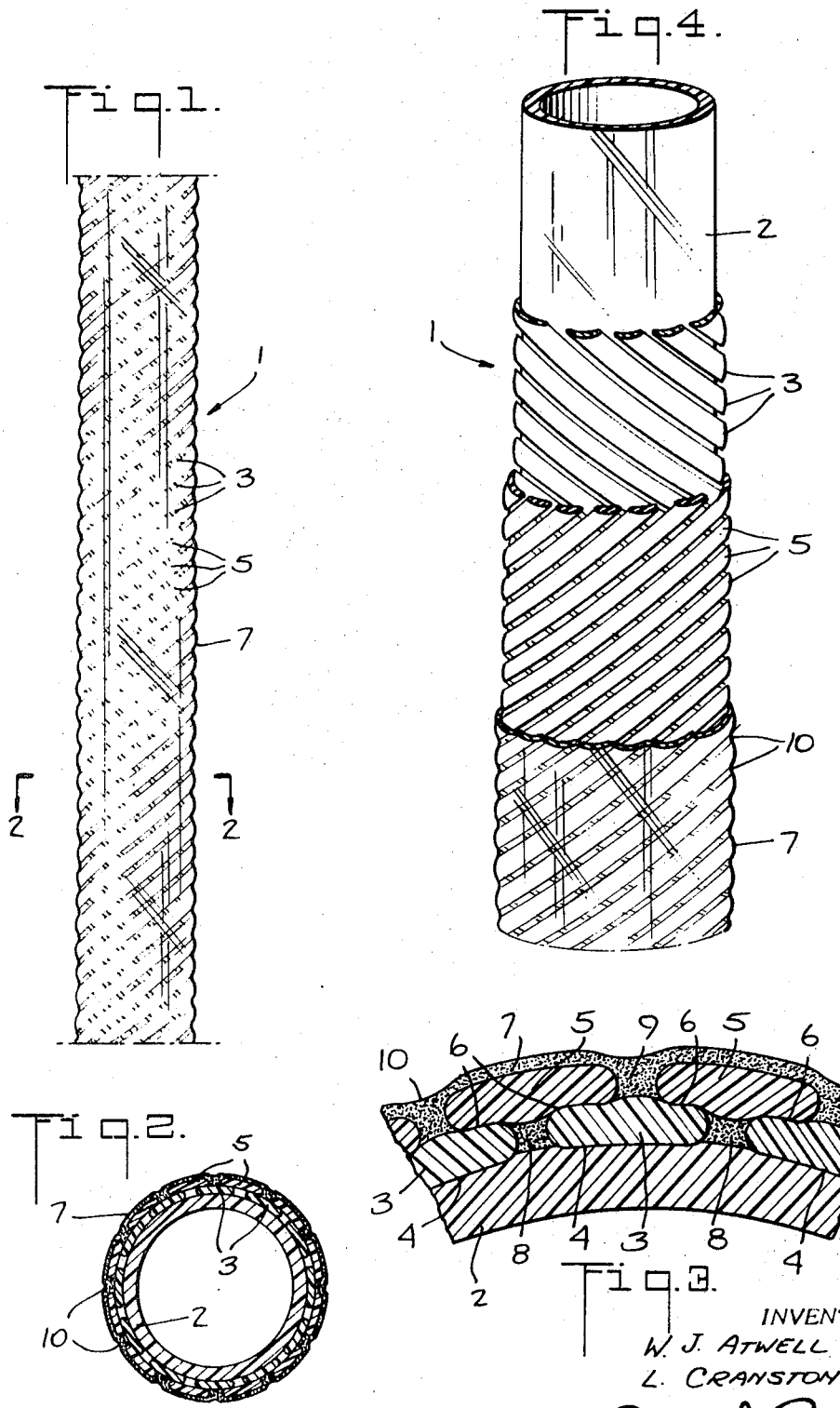

TEXTILE-REINFORCED ALL-POLYMERIC HOSE AND METHOD OF MAKING SAME

CROSS-REFERENCE TO RELATED APPLICATION

This application is a continuation-in-part of copending application Ser. No. 818,236, filed Apr. 22, 1969, now abandoned in favor of this application.

BACKGROUND OF THE INVENTION

It is old, as in Koch U.S. Pat. Nos. 2,977,839 and 3,251,381, to make an all-nylon textile-reinforced plastic hose by plasticizing the surface of nylon tubing, applying a braided nylon textile reinforcement to the plasticized surface while it is plasticized, curing this assembly by passing it through a water bath to remove plasticizing agent, heating the resulting assembly, plasticizing the braid reinforcement and immediately extruding a nylon sheath over the plasticized surface of the braid. As is shown by the explicit teachings throughout of these patents, and by actual commercial practice in the manufacture of all-nylon hose of this type, it has always been thought that no form of textile reinforcement other than braided nylon reinforcement could be used with any promise of success.

Our invention resides in our discovery that it is possible to use helically wrapped thermoplastic textile reinforcement (otherwise designated as "spiral wrap reinforcement") in manufacturing all-polymeric hose particularly suitable for pressure service, preferably all-nylon hose, and to thereby obtain a hose which not only is as good as hose reinforced with braided textile as in the Koch patents but is even superior to such braided hose in certain important respects such as increased flexibility and the ability to better withstand the stresses imposed by repetitive impulse loads. These enhanced properties are important in the principal application of this kind of hose which is for pressure service such as in refrigeration, air conditioning, and hydraulic, pneumatic and other applications.

SUMMARY OF THE INVENTION

Briefly stated, our invention resides in the discovery that we can make a very successful all-polymeric, integral hose especially adapted for pressure service, preferably an all-nylon hose, comprising an inner thermoplastic (e.g. nylon) tube, a first layer of parallel thermoplastic (e.g. nylon) textile reinforcing elements wound helically (which term is synonymous with "spirally") in one direction around the tube in direct contact therewith at an angle with respect to the longitudinal axis of the tube and fused to the outer surface of the tube at the interface or areas of contact between the elements of the first layer and the tube, a second layer of such reinforcing elements wound helically around the first layer in direct contact therewith but in a direction opposite to the direction of the first layer and at approximately the same angle with respect to the longitudinal axis of the tube as the first layer, the elements of the first and second layers being fused to one another at the areas of contact therebetween, and an outer protective polymeric (e.g. nylon) jacket surrounding the assembly and bonded thereto.

In its method aspects, our invention broadly resides in a method of making a hose of the type described above which comprises winding a first layer of parallel thermoplastic textile reinforcing elements helically around and in direct contact with an inner thermoplastic tube and at an angle with respect to the longitudinal axis of the tube, effecting fusion of the elements of this layer to the outer surface of the tube at the interface therebetween, winding a second layer of parallel thermoplastic textile reinforcing elements helically around and in direct contact with the first layer but in a direction opposite to that of the first layer and at approximately the same angle with respect to the axis of the tube, effecting fusion of the elements of the first and second layers to one another at the areas of contact therebetween, and applying an outer protective polymeric jacket around the resulting assembly.

Other aspects of our invention will be apparent from the following description.

BRIEF DESCRIPTION OF THE DRAWINGS

In the accompanying drawings:

FIG. 1 is a plan view of a typical hose of the invention;

FIG. 2 is an enlarged sectional view taken on line 2—2 of FIG. 1;

FIG. 3 is a greatly enlarged sectional view of a portion of the hose of FIG. 2;

FIG. 4 is an enlarged view similar to FIG. 1 but having portions of the hose wall cut away to show details of construction.

Figure 5:
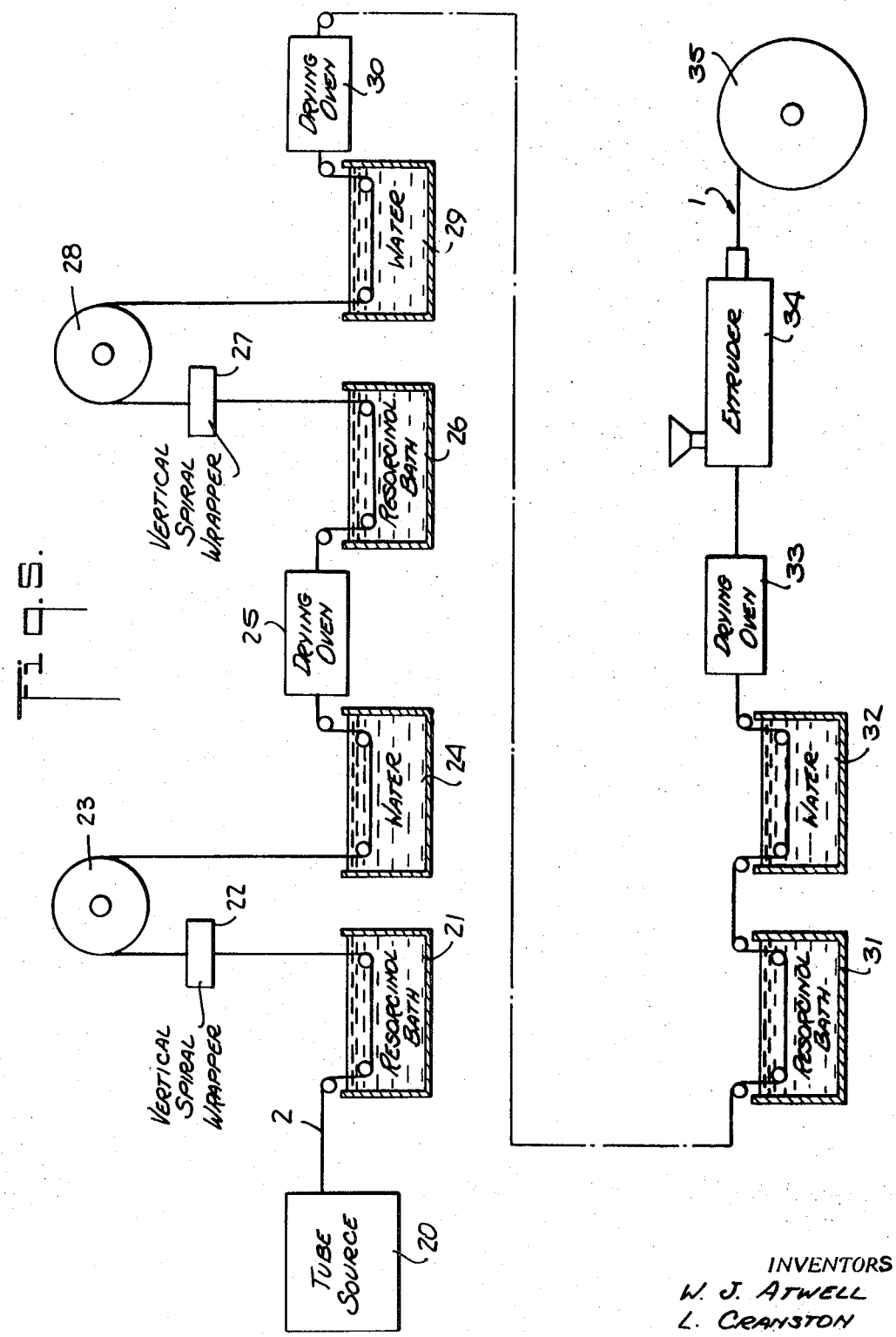
FIG. 5 is a diagrammatic representation of typical equipment and method for making a hose of the invention.

In the drawings the size and spacing of the reinforcing textile elements are exaggerated somewhat for purposes of illustration.

DETAILED DESCRIPTION OF INVENTION

The production of an all-nylon hose in accordance with our invention will now be described with reference to the accompanying drawings.

A nylon tube 2 is supplied from a tube source 20 which can be either an extruder or a supply of previously manufactured nylon tubing. Tube 2 is passed through a bath 21 of resorcinol-water solution which contains such a concentration of resorcinol and is maintained at such a temperature that when these factors are correlated with time of exposure the outer surface of the tube is softened and plasticized. The externally softened tube is then passed vertically upwardly through a vertical spiral wrapping machine 22 which applies a plurality of parallel nylon textile reinforcing yarns 3 in one direction. Actually these yarns are wrapped helically. The assembly then passes over capstan 23 and down into water bath 24. The time elapsed between application of the first helical textile winding by unit 22 and removal of resorcinol in bath 24 is such that the yarns 3 are fused to the outer surface of tube 2 as indicated at 4 in Fig. 3. It will be understood that the surfaces of yarns 3 in contact with the softened outer surface of tube 2 are also softened or plasticized by the action of the resorcinol-water solution and thereby caused to fuse and merge integrally therewith at the interface.

The assembly is then passed through drying oven 25 which serves to remove substantially all water therefrom and prevent undesired dilution of the resorcinol in the next bath 26 which is usually identical with bath 21 and maintained under similar or the same conditions. During passage through resorcinol-water bath 26, the exterior portions of the first layer of yarns 3 are softened and plasticized by the resorcinol. The assembly then passes vertically upwardly through vertical spiral wrapper 27 which applies a second layer of parallel nylon yarns 5 helically around the first layer of yarns 3 in a direction opposite to the direction of the first layer and at approximately the same angle with respect to the longitudinal axis. The angle of the helical winding in both layers is typically 52°. The result is that the contacting areas of yarns 5 are softened or plasticized by the action of the resorcinol solution and caused to fuse or coalesce with the corresponding areas of yarns 3 to form integrally bonded areas.

The assembly then passes around capstan 28 and vertically downwardly into water bath 29 which again serves to remove substantially all of the resorcinol. The time elapsed between application of the second layer of textile yarns 5 and the short-stopping of the resorcinol plasticizing agent in water bath 29 is such that fusion of yarns 5 to yarns 3 takes place at the areas of contact therebetween indicated by reference numeral 6 in Fig. 3.

The water-wet assembly then passes through drying oven 30 to remove the water and again prevent dilution of the next resorcinol bath 31 through which the assembly passes. The action of the resorcinol-water solution of bath 31 is to soften and plasticize the outer surfaces of the yarn elements 5 of the second spiral wrap and effect a change therein such that even though the resorcinol contained in the resulting assembly is removed when it is passed through water bath 32, followed by removal of water in drying oven 33, the subsequently applied nylon outer jacket 7 applied by extruder 34 is unexpectedly strongly bonded to the resulting activated surface. The action in extruder 34 is such that the extruded nylon is forced, at the high temperature and pressure used in the extrusion step, into the accessible interstices of the assembly. The result is that when yarns 3 and 5 of the first and second layers are spaced apart in the assembly, as shown in FIG. 3, the nylon or other polymeric material applied by extruder 34 completely fills the interstices 8 between yarns 3, yarns 5 and inner tube 2 and also completely fills the interstices 9 between yarns 5. When the yarns in the several layers tightly abut one another, the nylon or other polymeric material applied by extruder 34 cannot penetrate between them with the result that any interstices between inner yarns 3 and tube 2 remain empty in the final hose; this in no way impairs the usefulness of the product.

The assembly leaving extruder 34 is allowed to cool to solidify the hot nylon or other thermoplastic material applied in extruder 34, thus giving the final product 1 which may be wound up, if desired, as on take-up reel 35.

When outer jacket 7 is formed from a thermosetting or vulcanizable polymeric material, the assembly leaving extruder 34 is subjected to any suitable treatment to effect curing or vulcanization of the polymeric jacket.

In view of the explicit teachings of the Koch patents cited above that braided textile reinforcement must be used and in view of the fact that in actual commercial practice only braided reinforcement was used prior to the present invention to make all-nylon hose of the general type in question, i.e. integral plastic hose acceptable for use in pressure service, it was completely unexpected and unobvious to find not only that it is possible to use helically wrapped plastic textile reinforcement but also to find that use of such helically wrapped reinforcement results in a hose which is more flexible and has a greater ability to withstand repetitive impulse loads than hose made with braided reinforcement. As a consequence, it is possible, utilizing the teachings of the present invention, to use somewhat less material and still get an acceptable product.

An important feature of our invention is that our outer polymeric jacket is tightly bonded to all of the accessible or exposed portions of the underlying assembly, namely any accessible exposed outer portions of the inner tube and exposed portions of the several layers of textile reinforcing elements surrounding the same. We believe that this type of bonding is to an important extent attributable to activation of the aforementioned exposed portions by the plasticization effected by the resorcinol-water bath or other softening agent. The enhanced bonding by reason of this activation is unexpectedly achieved despite the removal of virtually all, or all, of the plasticizing agent in the several removal steps preceding application of the outer jacket. We do not fully understand the mechanism of this activation of the exposed surfaces of the several components in the assembly; it may be due to a chemical or quasi-chemical interaction between the plastic of those components and the softening agent or to some sort of etching of the exposed surfaces by that agent. In any event it is not destroyed by the removal of substantially all of the resorcinol or other softener in the bath of water or other solvent therefor.

When nylon or other thermoplastic material is used to form the outer jacket 7, tight bonding of the outer jacket is also in part attributable to the high temperature (typically 430°-500 °F.) at which the thermoplastic material is extruded around the assembly.

The tight bonding of the outer jacket, whether made of thermoplastic, thermosetting or vulcanizable material is further attributable to the fact that in its application in the extrusion operation the polymeric material used in the jacket actually penetrates into and fills all of the accessible interstices in the assembly between adjacent or adjoining textile reinforcing elements (i.e. between elements in the same helical wrap and elements in adjoining helical wraps) and between the inner helical wrap and the inner tube.

It will be understood that where the textile elements are spaced, the polymeric material of the extruded jacket 7 penetrates the assembly around the several layers of textile reinforcing elements and into contact with the inner nylon tube. The polymeric material of jacket 7 thus envelopes and surrounds the textile reinforcing elements of the several helical layers to the extent that such envelopment is possible.

VARIABLES

It will be understood that the details of the drawings and this specification are given for illustrative purposes only and are not limiting. Thus, for example, while we have referred to vertical spiral wrappers 22 and 27 we are not limited thereto but could use spiral wrapping units of any suitable type such as horizontal wrappers. Likewise, as will be obvious, we are not restricted to using capstans 23 and 28 but could use any form of take away means e.g. a "caterpillar". Similarly, instead of using drying ovens 25, 30 and 33 to remove water we could expose the assembly in each instance to relatively dry air at ambient or elevated temperature for a time sufficiently extended to remove the water; alternatively we could use any other suitable drying means such as infrared units, microwave units, etc. Again, while we have portrayed a continuous process, we could carry out the process in a non-continuous manner.

The conditions under which the plasticizing, fusion and removal of plasticizing agent are carried out can vary widely. Those skilled in the art will be readily able to select suitable conditions such as concentration of plasticizer and temperature of the softening baths, time of plasticization, and temperature of the solvent baths used to remove plasticizer, so as to achieve the desired results.

With reference to the kind of plastic used, we prefer to use nylon (polyamide) throughout our hose, i.e. for the inner tube, the helical wraps and the outer jacket. Any type of nylon can be used, such as nylon 6 (polyhexamethylene adipamide) or nylon 66 (polymerized epsilon caprolactam) or a copolymer of these two types.

Instead of nylon, we can less preferably use other thermoplastic materials, such as polyesters, e.g. poly(ethylene terephthalate) such as "Dacron" (trademark) or "Terylene" (trademark), vinyl plastics such as polyvinyl chloride or copolymers of vinyl chloride and vinyl acetate such as "Vinyon", acrylic plastics such as those which are largely based on acrylonitrile, e.g. "Dynel" (trademark), "Orlon" (trademark), "Acrilan" (trademark) and "Creslan" (trademark), vinylidene chloride polymers and copolymers such as "Saran" (trademark), polyolefins such as polypropylene, etc. See "Man-Made Fibres" by Moncrieff, published 1966 by Wiley, for descriptions of these various materials and their chemistry.

We prefer to use the same kind or type of plastic throughout our hose but we can use different plastics for different components provided they are compatible and miscible with one another so that they will fuse with each other to form an integral bond and provided a practical common softening or plasticizing agent is available to effect their softening or plasticization and to effect fusing of the inner wrap to the inner tube and of the adjacent wraps to one another. In this connection the effect to be achieved is surface plasticizing or softening and not necessarily swelling. Too much swelling would result in lack of the necessary dimensional control.

Any material capable of achieving the necessary softening or plasticizing can be used to effect the fusion as well as the desired activation in preparation for reception of the outer jacket. While a gaseous softening agent could conceivably be used, in practice we almost invariably use a liquid softener. The softener is of course selected with reference to the particular plastic. For nylon, we prefer to use a resorcinal-water solution but we could use a resorcinal-ethanol solution or fluorinated ketones, such as hexafluoroacetone, which could be used either as a gas or in the liquid hydrate forms or as an aqueous solution. For polyesters we can use hot meta-cresol in water or a cold aqueous solution of ortho-chlorophenol as the softening agent. Those skilled in the art can readily select suitable plasticizing or softening agents for use with the various thermoplastics as by consulting such treatises as the above-mentioned Moncrieff book.

In some cases it may be desirable to use different solvating agents in the three solvating steps carried out in baths 21, 26 and 31. Thus when nylon 11 is used in the inner tube 2 we may use hexafluoroacetone trihydrate in bath 21 and we may use resorcinol-water solutions in baths 26 and 31. Furthermore, in some cases as where the process is operated continuously, it may be possible to eliminate baths 24 and 29 and rely upon the third bath 32 to effect substantially complete removal of all solvating agents in the assembly prior to the application of the outer jacket 7.

The removal of the softening or plasticizing agent is generally accomplished by passing the assembly through a liquid bath of any suitable solvent capable of removing such agent. Instead of using a liquid bath, it would be possible to flood or cascade the washing medium onto the assembly to remove the softener. The selection of a solvent to achieve removal of the plasticizer is well within the skill of the art. For example, for removing water-soluble softeners or plasticizers, such as resorcinol or hexafluoroacetone, we generally use water but we could use ethanol or aqueous ethanol.

Removal of substantially all of the softener or plasticizer from the assembly prior to the application of the outer jacket is preferred since otherwise residual softener may cause undesired loss of strength in the reinforcing elements.

The polymeric material from which the outer jacket 7 is formed can be either thermoplastic or thermosetting, the latter types of material requiring after-treatment in any suitable way to effect curing. Any thermoplastic material such as those already mentioned or any other suitable thermoplastic polymeric material, e.g. thermoplastic polyurethanes, such as "Roylar" (trademark), S-B-S block copolymers of butadiene and styrene, such as "Kraton" (trademark) and "Thermolastic" (trademark) can be used. Examples of suitable thermosetting materials include curable polyurethanes, curable elastomers, such as natural rubber and synthetic rubbers such as neoprene, nitrile rubber, SBR, CBR, IR, EBR and EPDM, curable rubber-resin blends such as blends of nitrile rubber and PVC such as "Paracril OZO" (trademark), compounded in the usual way with fillers, curatives, antioxidants, processing oils, and special purpose chemicals.

We generally prefer to use multifilament yarns as the textile reinforcement in the practice of our invention. As is well-known, such yarn consists of a bundle of continuous synthetic filaments each as long as the length of yarn itself. Alternatively, we can use staple yarns which consist of relatively short (e.g. 4–6 inches long) filaments twisted together to form a yarn of indefinite length. Still further, we could in some circumstances use so-called monofils which are solid single component elements generally cylindrical in cross-section and are available in any length. However, when monofils of the type now available are used the monofils are locked into a stiff rigid structure with the result that the hose produced is exceedingly stiff and is not acceptable in applications where flexibility is imperative.

The yarn (or monofil) application in each of the helically wrapped layers of our hose can best be described in terms of helix angle and the percent of coverage achieved. The helix angle can vary from 38° to 62° from the longitudinal axis. An angle of about 52° is often preferred. The percent of coverage can vary from say 30 percent to 100 percent. All factors are correlated to achieve a hose having the desired characteristics. For example, a hose with a ¼ inch I.D. and an 0.30 inch wall if built with a spiral wrapping machine which applied yarn from 24 spools in each direction might have as many as 30 plaits per inch. As another example, a hose with a 1 inch I.D. and a wall of 0.75 inch built with machines which spirally applied yarn from 12 spools might have as few as four plaits per inch.

With respect to flattening of yarns, the degree of flattening will depend on two factors, namely, the amount of twist and the amount of tension under which the yarns are applied in the spiral wrapping steps. At a low twist of say one turn per inch and at a wrapping tension of 2 pounds or more a yarn section would be developed with a width greater than double the height. With a twist of five turns per inch and a tension of less than 2 pounds per inch there would be no substantial flattening.

Each successive wrap of textile reinforcement is at approximately the same angle as the preceding wrap but is oppositely disposed. It is not required that the angle of the successive wraps be identical but we prefer that they be as nearly identical as is possible with good manufacturing practice.

For the helical reinforcing wraps of our hose, we prefer to use multifilament yarns having low to moderate twist, i.e. yarns having a total twist of not less than 1 and not more than five turns per inch and most preferably yarns having from 1½ to 2½ turns per inch. These figures refer to total twist and include any producer's or manufacturer's twist which usually is not over one-half turn per inch. We could theoretically use yarns having considerably more than five turns per inch but the number of turns per inch is often limited in practice to a maximum of about five in part by the practical consideration of expense of twisting (since twisting adds to the cost) and in part to the fact that a twist of more than five turns per inch would prevent that flattening of the yarns as they are applied which is desirable for flexibility and because it gives hose with a smaller overall diameter for a given resistance to repetitive impulse loads. By adding twist beyond the producer's twist so that we have a total twist of from one to five turns per inch, and preferably from 1½ to 2½ turns per inch, we attain the following results. Considering a given yarn 3 in the first layer, it is firmly anchored by fusion to the tube 2 all along its contacting area indicated by reference numeral 4 and it is locked by fusion at the areas of contact indicated by reference numeral 6 to the adjacent yarns 5 at very frequent intervals. A similar consideration applies to the locking by fusion of any given yarn 5 of the second layer throughout its length to yarns 3 of the first layer at points 6 and this provides a firm anchoring. Substantially all of the individually filamentary strands within any one of these locked yarns 3 and 5 lying between these fused locking points can move with reference to one another when the hose is flexed, giving good flexibility. Consequently it will be seen that by using a low twist of from one to five, and more preferably from about 1½ to 2½, turns per inch we insure that every one of the filaments within a short distance axially of any given yarn is bonded securely by fusion at frequent intervals along its length without impairing flexibility. In addition, the degree of twist which we prefer to use gives the hose better impulse life.

While multifilament yarns having a total twist of from zero to 15 turns per inch can be used in the practice of the invention, it is preferred to use such yarns having a total twist of from one to five turns per inch.

The spacing or lack of spacing of the textile reinforcing elements in a given layer is governed largely by the size or denier of the yarns or monofils, which in turn is determined by the overall diameter and the required resistance to repeated stress loads and bursting. In many cases, in order to get higher strengths we use higher denier yarns and abut them as they are applied helically.

In practicing our invention it is essential that at least two helical wraps be used. Any number of wraps greater than two, typically four or six, can be applied, each pair of successive wraps being fused at their points of contact as described herein. One could even apply an odd number of wraps, e.g. three, but in this case it would be necessary to resort to special measures to achieve a balanced construction such that the total strength and elongation of the helical textile reinforcement in one direction is equal to the total strength and elongation of reinforcement in the opposite direction.

Instead of using completely separate yarns (or monofils) in making the spiral wraps, it would be possible to use a "tape" of these spaced textile elements loosely held together with a binder or light weft.

The following examples illustrate our invention:

EXAMPLE 1

Nylon copolymer of type 6 and type 66 was extruded at 430°F. to produce a tube having an inside diameter of five-sixteenth inch and a wall thickness of 0.030 inch. This tube was cooled to room temperature and passed through a bath of 1 part resorcinol to 3 parts of water at 175°F. at a rate to provide a 50 second immersion time. While still softened and wet, this tube was passed through a spiral wrapping machine which applied a wrap of 3360 denier nylon 66 multifilament yarns having 1½ turns per inch twist to the plasticized surface of the wet tube. Twelve plaits/inch with 12 such yarns in spaced parallel relationship were applied at a time at an angle of approximately 52° to the longitudinal axis of the tube. The resulting assembly was then passed into a hot water bath at a temperature of 175°F. at a rate to provide a two minute immersion time to (a) coact with the resorcinol and stop the plasticizing action, and (b) to remove excess resorcinol. The assembly was then heated at 230°F. for 10 minutes to dry it.

The dried assembly was then passed through a second resorcinol-water bath identical with the first and under the same conditions as the first. The wet plasticized assembly was then wound with a second spiral wrap identical with the first but at the same but opposite angle to the angle of the first. The assembly was then passed through a hot water bath at the same temperature and for the same immersion time as before, after which it was dried at 230°F. for 10 minutes.

The doubly wrapped tube was then passed through a third resorcinol-water bath of the same composition and operated under the same conditions as the first two baths. If was then passed through a hot water bath just like the first two water baths and under the same conditions and then dried at 230°F. for 10 minutes. While the assembly was still hot from passage through the drying oven, it was passed through an extruder wherein a jacket of transparent 6–66 nylon copolymer 0.006 inch thick was applied at a temperature of 430°F. and caused to penetrate the assembly.

The resulting all-nylon hose had a burst strength of 3500 pounds per square inch.

EXAMPLE 2

Example 1 was followed with the following changes: The first bath contained 1 part resorcinol to 2.7 parts water, was at 140°F. and the immersion time therein was 9 seconds. Each of the spiral wraps comprised 2520 denier yarns and approximately 18 plaits/inch with 18 such yarns. The first water bath was at 140°F. with a 9-second immersion. The assembly leaving the first water bath was air-dried at room temperature for 15 hours.

The second solvating bath contained 1 part resorcinol and 1.28 parts water, was at 160°F. and the immersion time therein was 9 seconds. The second hot water bath was at 140°F. and the immersion time therein was 9 seconds. The assembly leaving this water bath was air dried at room temperature for 15 hours.

The third solvating bath contained 1 part resorcinol to 2 parts water, was at 160°F. and the immersion time therein was 9 seconds. The third water bath was at 140°F. and the immersion time therein was 9 seconds. The resulting assembly was dried at 170°F. for 16 hours.

The extruded nylon jacket was formed of pigmented 6–66 nylon 0.010 inch thick.

The resulting hose had a burst strength in excess of 4650 psi.

EXAMPLE 3

Example 2 was followed but with these changes: The nylon inner tube had an inside diameter of 0.50 inch and a wall thickness of 0.055 inch. The immersion time in all three solvating baths and in all three water baths was 6 seconds. Each of the spiral wraps consisted of 6720 denier yarns and approximately 10.6 plaits/inch with 18 such yarns.

The assembly removed from the third water bath was air dried at room temperature for 15 hours.

The resulting assembly was passed through an extruder wherein a jacket of compounded neoprene approximately 0.040 inch was applied. The jacketed assembly was then subjected to vulcanization by a conventional lead press method.

The resulting hose had a burst strength of 2300 psi.

EXAMPLE 4

Nylon 6 was extruded at 495°F. to produce a tube having an inside diameter of 0.250 inch and a wall 0.045 inch thick. After cooling, the tube was passed through an aqueous resorcinol bath like that used in Example 1 but held at a temperature of 185°F., at a rate to provide an immersion time of 45 seconds. A 4200 denier multifilament yarn wrap of type 66 nylon having 2½ turns/inch was spirally wound onto the wet plasticized tube surface, winding 12 yarns at a time, with 13.3 plaits/inch at an angle of 52°. The assembly was then passed through a water bath just like that used in Example 1 and was dried as in that example. The dried assembly was then passed through an aqueous resorcinol bath just like that used in Example 1 after which a second layer of spiral wrap nylon 66 reinforcement was wound in the same manner as the first layer except in the opposite direction. The assembly was washed with water, dried and then treated with a third resorcinol bath, all as in Example 1, passed through a water bath as in that example, dried, and then jacketed with a copolymer of nylon 6 and nylon 66 in exactly the same way as in that example.

The resulting hose had a burst strength of 4500 pounds per square inch.

EXAMPLE 5

Nylon hose was made in the same way in Example 4 except that the three swelling baths were aqueous solutions of hexafluoroacetone trihydrate containing 3 parts of the latter to 1 part of water, held at room temperature, the rate of passage therethrough providing a dwell time of 25 seconds.

The product had a burst strength of 4500 pounds per square inch.

EXAMPLE 6

All-nylon hose was made exactly as set forth in Example 1 but using a nylon inner tube having an inside diameter of 0.250 inch and a wall thickness of 0.040 inch and applying 13.3 abutting 7560 denier yarns per inch in the two helical wrapping steps. The resulting hose had a burst strength of about 10,000 pounds per square inch.

GENERAL

While outer jacket 7 in FIGS. 1 and 4 is transparent so that textile reinforcing elements 5 and 3 are visible therethrough, it need not be formed from clear plastic but can equally be made of opaque or pigmented plastic. Similarly the other components of our hose, i.e. the inner tube and the textile reinforcing elements, can be formed from clear, opaque or pigmented plastic.

As shown in FIGS. 1–4, the outer surface of jacket 7 has a moderately undulated surface with slight depressions 10 opposite spaces 9 between yarns 5. This undulation occurs unintentionally and inherently in the extrusion step and in no way interferes with the usefulness of the hose.

The outer jacket of our hose performs a number of functions. In addition to adding strength, it protects the underlying components against access of grease, oil, dirt, water, etc. and it protects the textile reinforcing elements from injury as by abrading, snagging or cutting. It adds greatly to the abrasion- and cut-resistance of the hose. If desired, it can be pigmented or otherwise compounded to reduce degradation by heat, ultraviolet light, ozone, etc.

In the typical practice of our invention, as will be seen from FIG. 3, there is slight embedment of the first layer of helically wrapped textile reinforcing elements 3 into the surface of the inner tube 2; this occurs because the surface of the tube is softened and plasticized and because the yarns of the wrap are applied under tension.

By such terms as "fusion" and "fused", as used herein and in the claims, we refer to integral bonding or coalescence achieved by softening and/or plasticization of the contacting surfaces of both of two juxtaposed components of our hose whereby the plastic materials of both surfaces are caused to merge or coalesce and form an integral bond.

Having thus described our invention, what we claim and desire to protect by Letters Patent is:

1. A hose comprising an inner thermoplastic tube, a first layer of parallel thermoplastic textile reinforcing elements wound helically in one direction around said tube in direct contact therewith at an angle with respect to the longitudinal axis of said tube and fused to the outer surface of said tube at the interface between said first layer and said tube, a second layer of parallel thermoplastic textile reinforcing elements wound helically around said first layer in direct contact therewith in a direction opposite to the direction of said first layer and at approximately the same angle with respect to said longitudinal axis, the elements of said first layer and said second layer being fused to one another at the areas of contact therebetween, and an outer protective polymeric jacket surrounding the assembly and bonded thereto.

2. A hose as defined in claim 1 wherein said textile reinforcing elements are multifilament yarns having a twist of from zero to 15 turns per inch.

3. A hose as defined in claim 1 wherein said textile reinforcing elements are multifilament yarns having a twist of from one to five turns per inch.

4. A hose comprising an inner nylon tube, a first layer of parallel nylon textile reinforcing elements wound helically in one direction around said tube in direct contact therewith at an angle with respect to the longitudinal axis of said tube and fused to the outer surface of said tube at the interface between said first layer and said tube, a second layer of parallel nylon textile reinforcing elements wound helically around said first layer in direct contact therewith in a direction opposite to the direction of said first layer and at approximately the same angle with respect to said longitudinal axis, the elements of said first layer and said second layer being fused to one another at the areas of contact therebetween, and an outer protective nylon jacket surrounding the assembly and bonded thereto.

5. A hose comprising an inner nylon tube, a first layer of parallel nylon textile reinforcing elements wound helically in one direction around said tube in direct contact therewith at an angle with respect to the longitudinal axis of said tube and fused to the outer surface of said tube at the interface between said first layer and said tube, a second layer of parallel nylon textile reinforcing elements wound helically around said first layer in direct contact therewith in a direction opposite to the direction of said first layer and at approximately the same angle with respect to said longitudinal axis, the elements of said first layer and said second layer being fused to one another at the areas of contact therebetween, and an outer protective nylon jacket surrounding the assembly and bonded to the exposed portions of the underlying assembly which exposed portions were activated by plasticization thereof with a plasticizing agent removed prior to application of said jacket.

6. A hose comprising an inner nylon tube, a plurality of superimposed layers of parallel nylon textile reinforcing elements wound helically around said tube, adjacent layers of said helically wound elements being disposed in opposite directions and at approximately the same angle with respect to the longitudinal axis of said tube, the innermost layer of said elements being fused to the outer surface of said tube at the interface between said innermost layer and said tube, the elements of each pair of adjoining layers of nylon textile reinforcing elements being fused to one another at the areas of contact between such adjoining layers, and an outer protective nylon jacket surrounding the assembly and bonded thereto, said outer jacket impregnating and filling the accessible interstices of the underlying assembly.

7. A hose comprising an inner nylon tube, a plurality of superimposed layers of parallel nylon textile reinforcing elements wound helically around said tube, adjacent layers of said helically wound elements being disposed in opposite directions and at approximately the same angle with respect to the longitudinal axis of said tube, the innermost layer of said elements being fused to the outer surface of said tube at the interface between said innermost layer and said tube, the elements of each pair of adjoining layers of nylon textile reinforcing elements being fused to one another at the areas of contact between such adjoining layers, and an outer protective nylon jacket surrounding the assembly and bonded to the exposed portions of the underlying assembly which exposed portions were activated by plasticization thereof with a plasticizing agent removed prior to application of said jacket.

* * * * *